(12) United States Patent  
Fu (10) Patent No.: US 8,405,639 B1
(45) Date of Patent: Mar. 26, 2013

(54) SCANNING MIRROR TOUCH SCREEN WITH MINIMUM BEZEL HEIGHT

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 357 days.

(21) Appl. No.: 12/727,945

(22) Filed: Mar. 19, 2010

Related U.S. Application Data

(60) Provisional application No. 61/239,680, filed on Sep. 3, 2009, provisional application No. 61/261,270, filed on Nov. 13, 2009.

(51) Int. Cl.
*G06F 3/042* (2006.01)

(52) U.S. Cl. .................. 345/175; 178/18.09; 356/141.1

(58) Field of Classification Search .......... 345/175–176; 178/18.01, 18.03, 18.09, 18.11, 19.01, 19.05; 356/141.1–141.5
See application file for complete search history.

(56) References Cited

U.S. PATENT DOCUMENTS

| 7,359,041 B2 * | 4/2008 | Xie et al. ................... 356/141.1 |
| 2010/0277436 A1 * | 11/2010 | Feng et al. ................... 345/175 |

* cited by examiner

*Primary Examiner* — Michael Pervan
(74) *Attorney, Agent, or Firm* — Patent Law Group LLP; David C. Hsia (57) ABSTRACT

A touch screen display includes a screen, a bezel around the screen, and a MEMS package located within the bezel. The MEMS package comprises a MEMS scanning mirror and the top of the MEMS package is located below the top of the screen. At rest, a reflecting surface of the MEMS scanning mirror is parallel or slightly tilted relative to the screen but not substantially perpendicular to the screen. The display further includes a fixed mirror located in the bezel above the MEMS scanning mirror.

40 Claims, 12 Drawing Sheets

SCANNING MIRROR TOUCH SCREEN WITH MINIMUM BEZEL HEIGHT

CROSS REFERENCE TO RELATED APPLICATIONS

This application claims the benefit of U.S. Provisional Application No. 61/239,680, filed Sep. 3, 2009, and U.S. Provisional Application No. 61/261,270, filed Nov. 13, 2009, which are incorporated herein by reference.

FIELD OF INVENTION

This invention relates a scanning mirror touch screen with minimum bezel height.

DESCRIPTION OF RELATED ART

Figure 1:
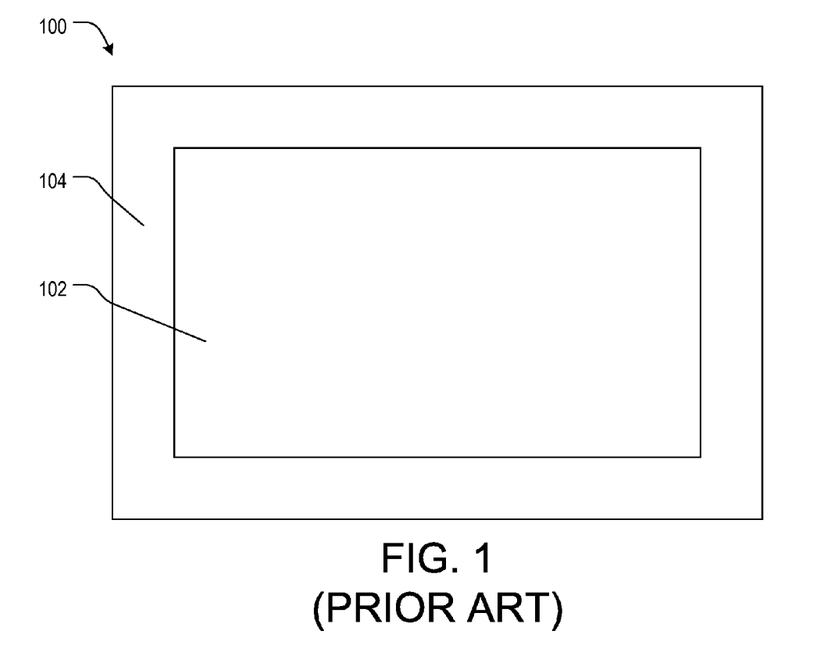
FIG. 1 illustrates a top view of a display.
Figure 2:
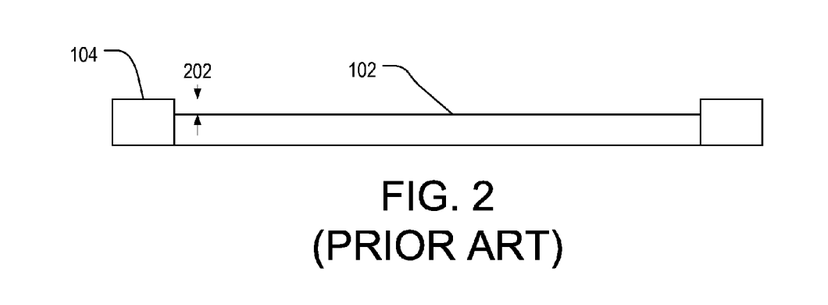
FIG. 2 illustrates a side view of the display of FIG. 1.

FIGS. 1 and 2 illustrate top and side views of a conventional display 100. Display 100 includes a screen 102 and a bezel 104 around the screen. Bezel 104 typically masks the non-viewable parts of display 100 from the user. Bezel 104 is taller by a height 202 (FIG. 2) than screen 102. Consumers prefer a lower bezel, such as one that is less than 2 mm taller than the screen.

SUMMARY

In one or more embodiments of the present disclosure, a touch screen display includes a screen, a bezel around the screen, and a micro-electro-mechanical system (MEMS) package located within the bezel. The MEMS package comprises a MEMS scanning mirror and the top of the MEMS package is located below the top of the screen. At rest, a reflecting surface of the MEMS scanning mirror is parallel or slightly tilted relative to the screen but not substantially perpendicular to the screen. The display further includes a fixed mirror located in the bezel above the MEMS scanning mirror.

BRIEF DESCRIPTION OF THE DRAWINGS

In the drawings.

Use of the same reference numbers in different figures indicates similar or identical elements.

DETAILED DESCRIPTION OF THE INVENTION

Figure 3:
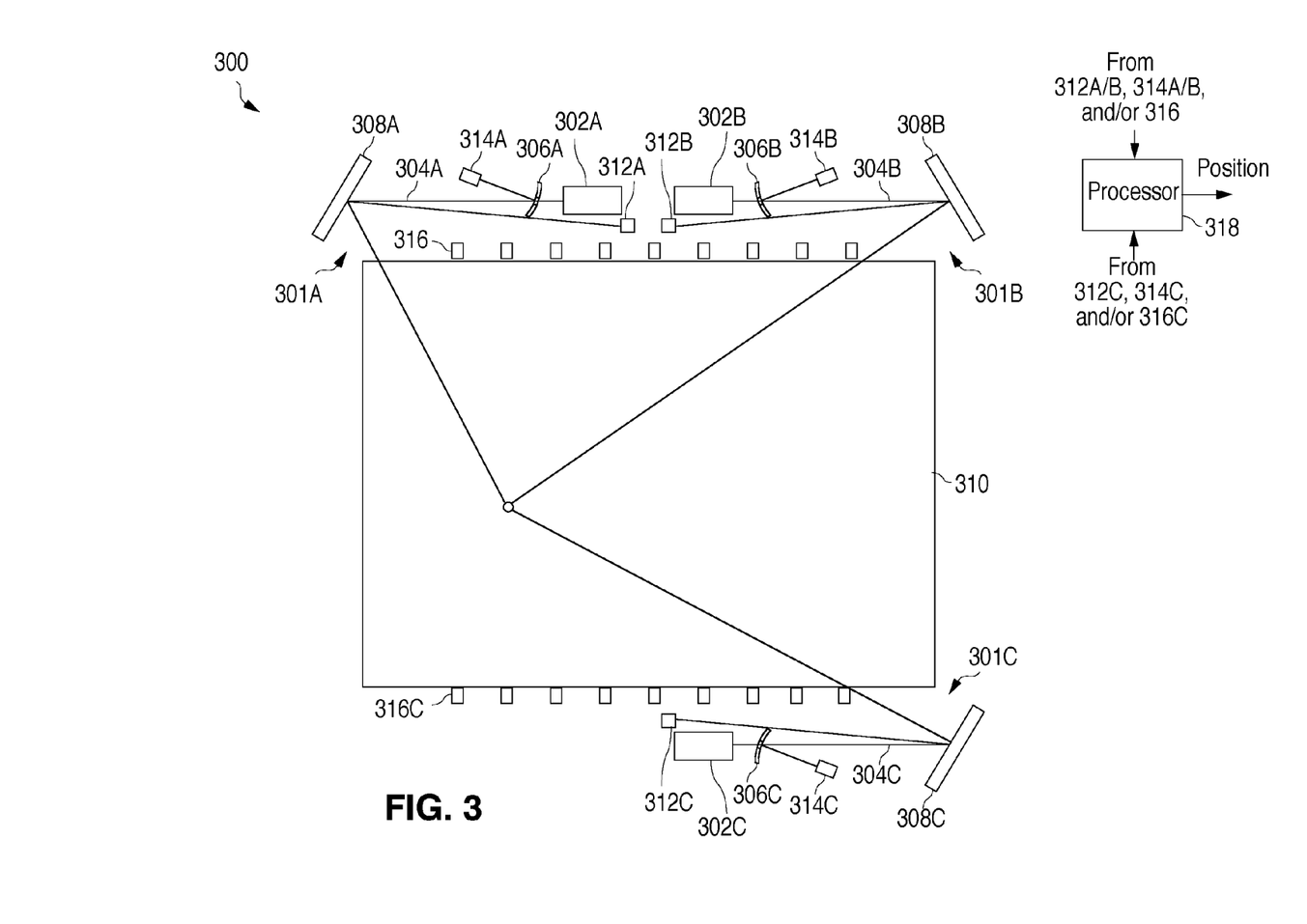
FIG. 3 illustrates a top view of a touch panel system in one or more embodiments of the present disclosure.

FIG. 3 illustrates a top view of a touch panel system 300 in one or more embodiments of the present disclosure. Touch panel system 300 includes a first micro-electro-mechanical system (MEMS) group 301A, a second MEMS group 301B, and an optional third MEMS group 301C. MEMS group 301A includes an emitter 302A that produces a beam 304A of laser or light, which passes through an aperture or a transparent flat window in an optional focusing device 306A to impinge an oscillating MEMS scanning mirror 308A. MEMS scanning mirror 308A reflects beam 304A in a sweeping motion across the surface of a screen 310. Screen 310 may be part of a flat panel display or a projection screen for a projection display system.

MEMS scanning mirror 308A is located about a corner of screen 310. A reference signal is generated when the beam 304A is reflected by MEMS scanning mirror 308A onto an element 312A, which is either a photo sensor or a reflective surface. With a reflective surface 312A, the reference signal is reflected back into itself and onto optional focusing device 306A. Optional focusing device 306A then directs the reference signal to an optional photo sensor 314A. With a photo sensor 312A, the reference signal is directly collected by the photo sensor.

As beam 304A sweeps over screen 310, a finger or an interrupting probe will reflect the beam, resulting in a momentary increase in intensity. The interrupted beam 304A is reflected by MEMS scanning mirror 308A back towards optional focusing device 306A, which gathers the beam and directs it towards optional photo sensor 314A. As an alternative to optional focusing device 306A and optional photo sensor 314A, an array of photo sensors 316 (only one is labeled) is aligned along the edge of screen 310 between MEMS scanning mirror 308A and a MEMS scanning mirror 308B. Photo sensors 316 are coupled in parallel and have their lateral sensor surface facing into screen 310 to collect the reflected signal.

Second MEMS group 301B is in a mirror configuration of first MEMS group 301A located about an adjacent corner of screen 310. Notably an emitter 302B produces a beam 304B that sweeps from an element 312B downward into screen 310. The rest of the operations are similar to MEMS group 301A. Additional MEMS groups may be placed around screen 310 to increase the accuracy of touch panel system 300.

This reflected beam sensed by each of photo sensors 314A and 314B results in a signal that can be compared with a reference signal in the time domain. The oscillation of each of MEMS scanning mirrors 308A and 308B is periodic, like a pendulum, so that a processor 318 can compute the angular position of each of MEMS scanning mirrors 308A and 308B at the moment of interruption using a conventional formula. Alternatively capacitive sensing of the angular positions of MEMS scanning mirrors 308A and 308B is used to determine the angular positions of MEMS scanning mirrors 308A and 308B. Note that the angular positions of MEMS scanning mirrors 308A and 308B are twice the angular positions of beams 304A and 304B. Using the angular positions of MEMS scanning mirrors 308A and 308B at the moment of interruption and the distance between MEMS scanning mirrors 308A and 308B, processor 318 uses triangulation to determine the location of interruption or "touch." The resulting touch panel system is more reliable than in prior devices.

Figure 4A:
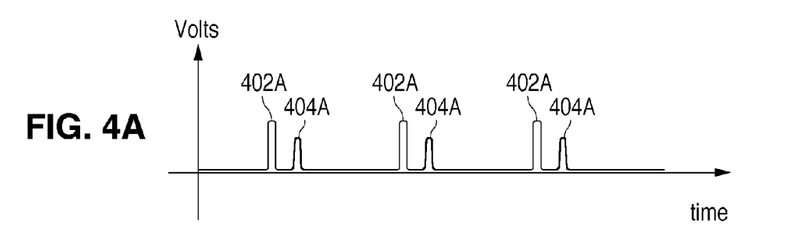
FIGS. 4A and 4B illustrate reference and reflected signals for determining a location of touch on the touch panel system of FIG. 3 in one or more embodiments of the present disclosure.

FIG. 4A shows a comparison of peaks 402A of the reference signal and peaks 404A of the reflected signal of a finger or interrupting probe on screen 310 from MEMS group 301A (FIG. 3) in one or more embodiments of the present disclosure. The reference and the reflected signals may be separate signals from photo sensors 312A and 314A (FIG. 3), or photo sensor 312A and 316 (FIG. 3), that are superimposed over each other. The time difference between peaks 402A and 404A is utilized to determine the angular position of MEMS scanning mirror 308A at the moment of interruption from a polar coordinate centered at the MEMS scanning mirror 308A. Note that FIG. 4A assumes emitter 302A is turned on to generate beam 304A when MEMS scanning mirror 308A is rotating in one direction, and then turned off when the MEMS scanning mirror is rotating in a second direction. If emitter 302A remains on in both directions, a mirror image of the reference and reflective signals would be present.

Figure 4B:
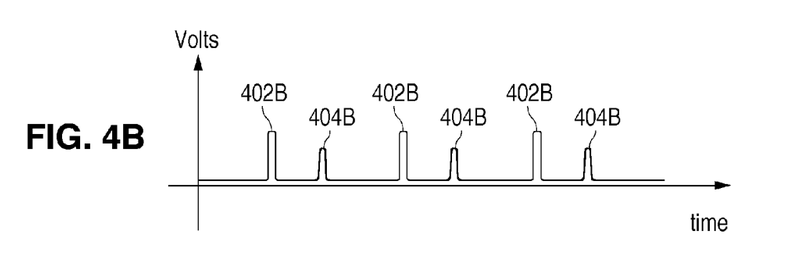

FIG. 4B shows a comparison of peaks 402B of the reference signal and peaks 404B of the reflective signal of a finger or interrupting probe on screen 310 from MEMS group 301B in one or more embodiments of the present disclosure. The time difference between peaks 402B and 404B is utilized to determine the angular position of MEMS scanning mirror 308B at the moment of interruption from another polar coordinate centered at the MEMS scanning mirror 308B. Once the angular positions of MEMS scanning mirrors 308A and 308B at the moment of interruption are determined, the XY coordinates of the finger or probe can is obtained by triangulation based on the distance between and the angular positions of the MEMS scanning mirrors.

When MEMS scanning mirrors 308A and 308B share an array of photo sensors 316, system 300 should have a method to differentiate the reflected signals for the MEMS scanning mirrors. In one method, the emitter for one MEMS scanning mirror is turned on while the emitter for the other MEMS scanning mirror is turned off when they rotate in one direction (e.g., clockwise), and vice versa. In another method, the MEMS scanning mirrors have different scanning periods. The correspondence between the reflected signals and their respective MEMS scanning mirrors is then determined based on the periodic pattern of the reflected signals.

Referring back to FIG. 3, optional third MEMS group 301C provides additional information for processor 318 to determine the XY coordinates of the finger or probe. The additional information helps to increase the resolution of touch detection. The additional information also helps to resolve any ambiguities generated by simultaneously touches on screen 310, which may otherwise have two solutions based on the angular positions only two MEMS scanning mirrors.

Figure 5:
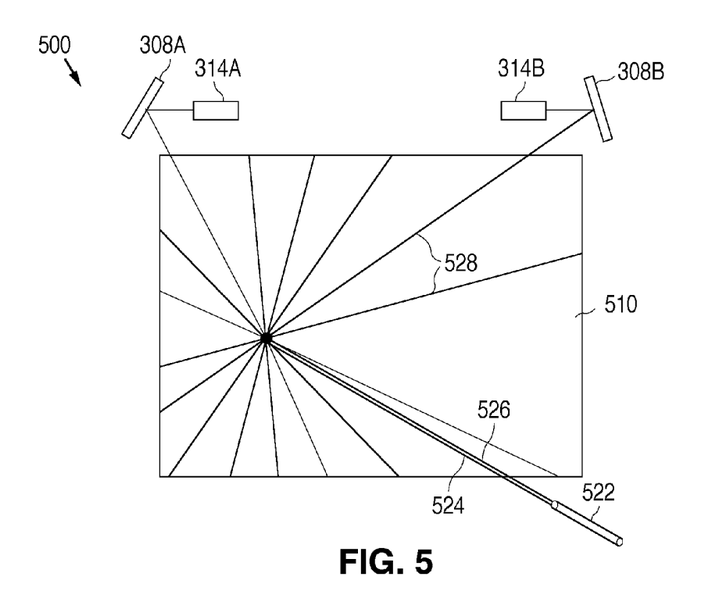
FIG. 5 illustrates a top view of another touch panel system in one or more embodiments of the present disclosure.

FIG. 5 illustrates a top view of a touch panel system 500 in one or more embodiments of the present disclosure. System 500 includes an emitter 522 producing a pointer beam toward a screen 510. The pointer beam including beams 524 and 526 of laser or light. Screen 510 may be part of a flat panel display or a projection screen for a projection display system. Beam 524 may be a visible laser beam and beam 526 may be either a UV or an IR laser beam. The selection of a UV or an IR laser beam depends on a coating layer on screen 510.

A UV laser beam 526 is used for a fluorescent coating layer on the surface of screen 510. When UV laser beam 526 hits the fluorescent coating layer, it generates omni-directional visible light 528 that is reflected by MEMS scanning mirrors 308A and 308B to respective photo sensors 314A and 314B. An IR laser beam 526 is used for a nano-imprint layer on the surface of screen 510. When IR laser beam 526 hits the nano-imprint layer, it generate omni-directional light 528 within the nano-imprint layer that is reflected by MEMS scanning mirrors 308A and 308B to respective photo sensors 314A and 314B.

Photo sensors 314A and 314B generate output signals when light is detected. Reference signals may be generated by placing one or more reference light sources, such as LEDs, to generate light that is reflected by MEMS scanning mirrors 308A and 308B to photo sensors 314A and 314B. The angular positions of MEMS scanning mirrors 308A and 308B at the moment of detection are then obtained using a conventional formula based on the time differences between the output and the reference signals as described above. Alternatively capacitive sensing is used to determine the scan angles of the MEMS scanning mirrors 308A and 308B. A processor determines the point of incidence of the pointer beam from emitter 522 on screen 510 by triangulation based on the distance between and the angular positions of MEMS scanning mirrors 308A and 308B. The path of the pointer beam may be displayed by or on screen 510 as a user moves the pointer to simulate writing on the display.

Figure 6:
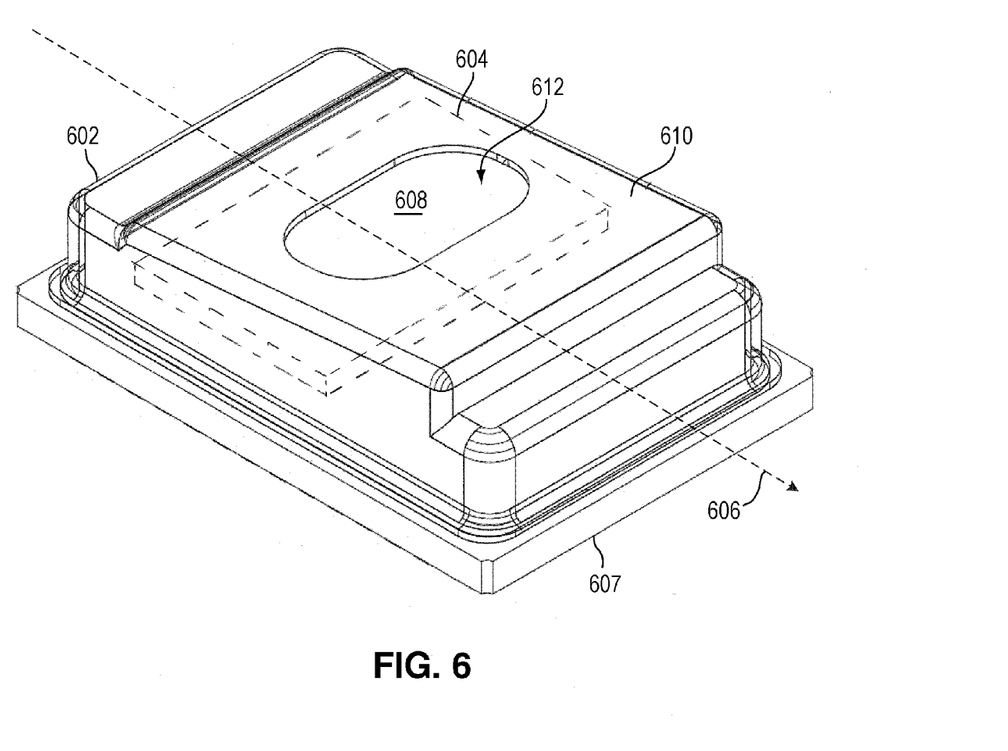
FIG. 6 illustrates a perspective view micro-electro-mechanical system (MEMS) package in one or more embodiments of the present disclosure.

FIG. 6 illustrates a perspective view of a MEMS package 602 with MEMS scanning mirror 604 (in phantom) in one or more embodiments of the present disclosure. MEMS scanning mirror 604 represents scanning mirror 308A or 308B in FIG. 3 or 5. MEMS package 602 may be square or rectangular, having a dimension of approximately 10 mm by 10 mm by 4 mm. MEMS scanning mirror 604 may be square, rectangular, or oval, having a reflective area of approximately 4 mm by 2 mm. MEMS scanning mirror 604 oscillates about a rotational axis 606 in both directions from an at rest position by an approximately equal scan angle. MEMS scanning mirror 604 is generally centered in MEMS package 602, its rotational axis 606 is generally parallel to a package bottom surface 607, and its reflective surface 608 is generally parallel to the bottom mounting surface at rest. A package top surface 610 has a transparent window 612 that is slightly angled to offset any ghost spot from a scan line of MEMS scanning mirror 604.

Figure 7:
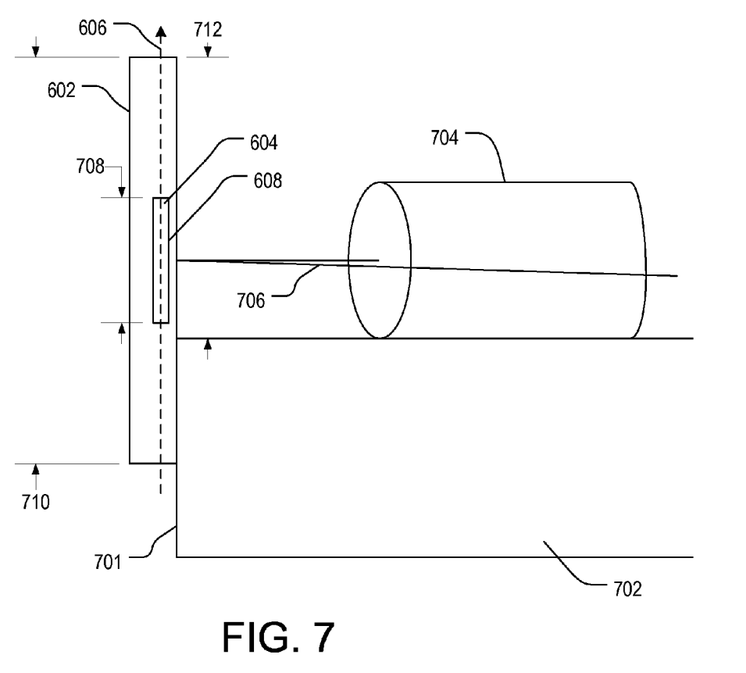
FIG. 7 illustrates a side view of the MEMS package of FIG. 6 located at a corner of a screen in a vertical configuration in one or more embodiments of the present disclosure.

FIG. 7 illustrates a side view of MEMS package 602 located in a bezel (not shown) at a corner 701 of screen 702 in a vertical configuration in one or more embodiments of the present disclosure. Screen 702 represents screen 310 or 510 in FIG. 3 or 5. An emitter 704 also located in the bezel generates a beam 706 toward MEMS scanning mirror 604. Emitter 704 represents emitter 302A or 302B in FIG. 3 or 5. MEMS package 602 is oriented vertically so rotational axis 606 is perpendicular to the top surface of screen 606, and the normal to reflective surface 608 of MEMS scanning mirror 604 at rest bisects screen corner 701. This orientation allows MEMS scanning mirror 604 to mechanically rotate ±22.5 degrees about rotational axis 608, which generates an optical scan angles of ±45 degrees that covers a total of 90 degrees over screen 702.

To expose the entire reflective surface 608 to beam 706, MEMS package 602 is positioned vertically so more than half of the package is above screen 702. Assuming the longest dimension 708 of MEMS scanning mirror 604 is 4 mm and the longest dimension 710 of MEMS package 602 is 10 mm, the top of the MEMS package may be taller than screen 702 by a height difference 712 of 7 mm. This means the bezel over MEMS package 602 would be taller than screen 702 by more than 2 mm.

Figure 8:
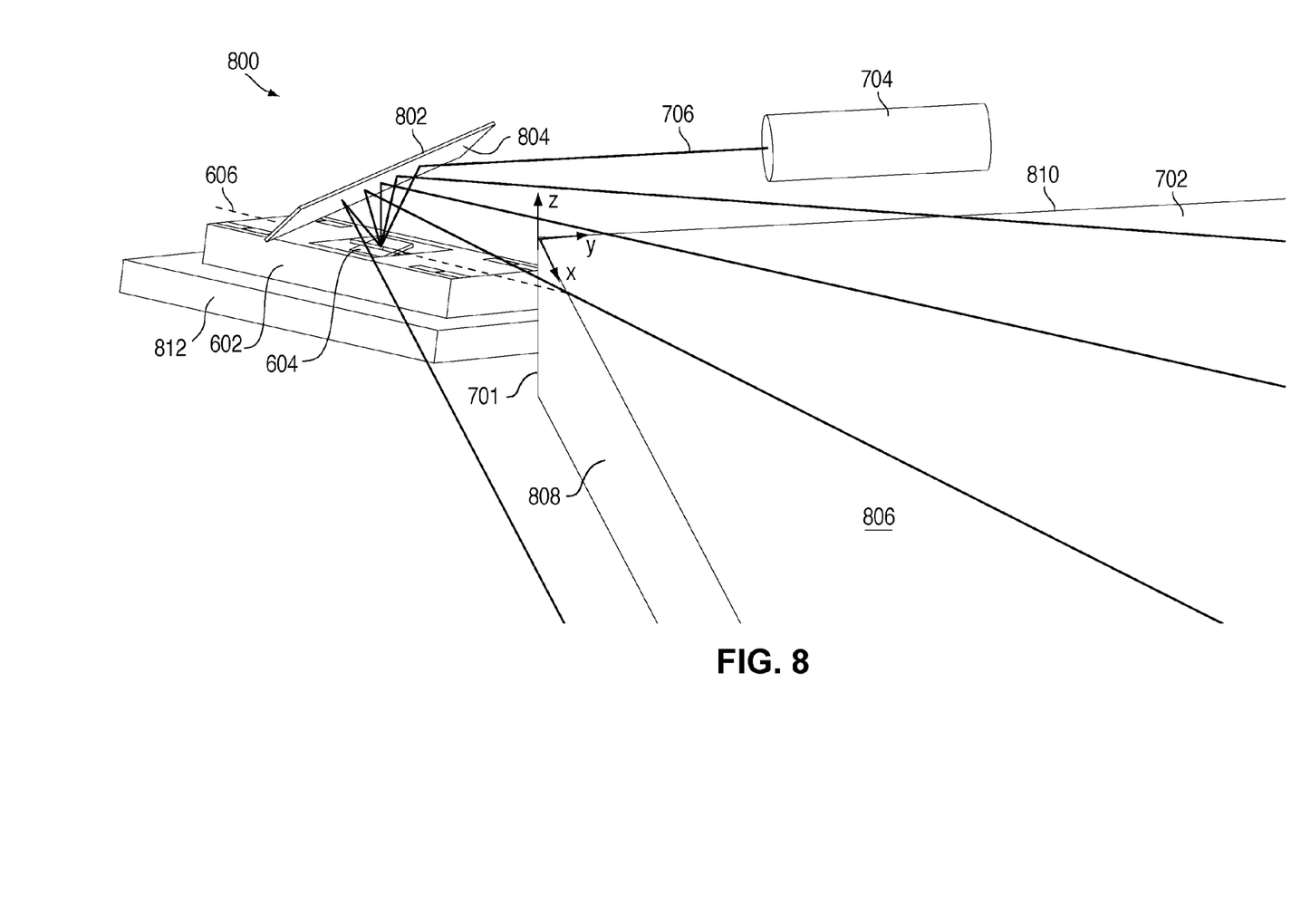
FIG. 8 illustrates a perspective view of a touch panel system with the MEMS package of FIG. 6 located at a corner of a screen in a substantially horizontal configuration in one or more embodiments of the present disclosure.
Figure 9:
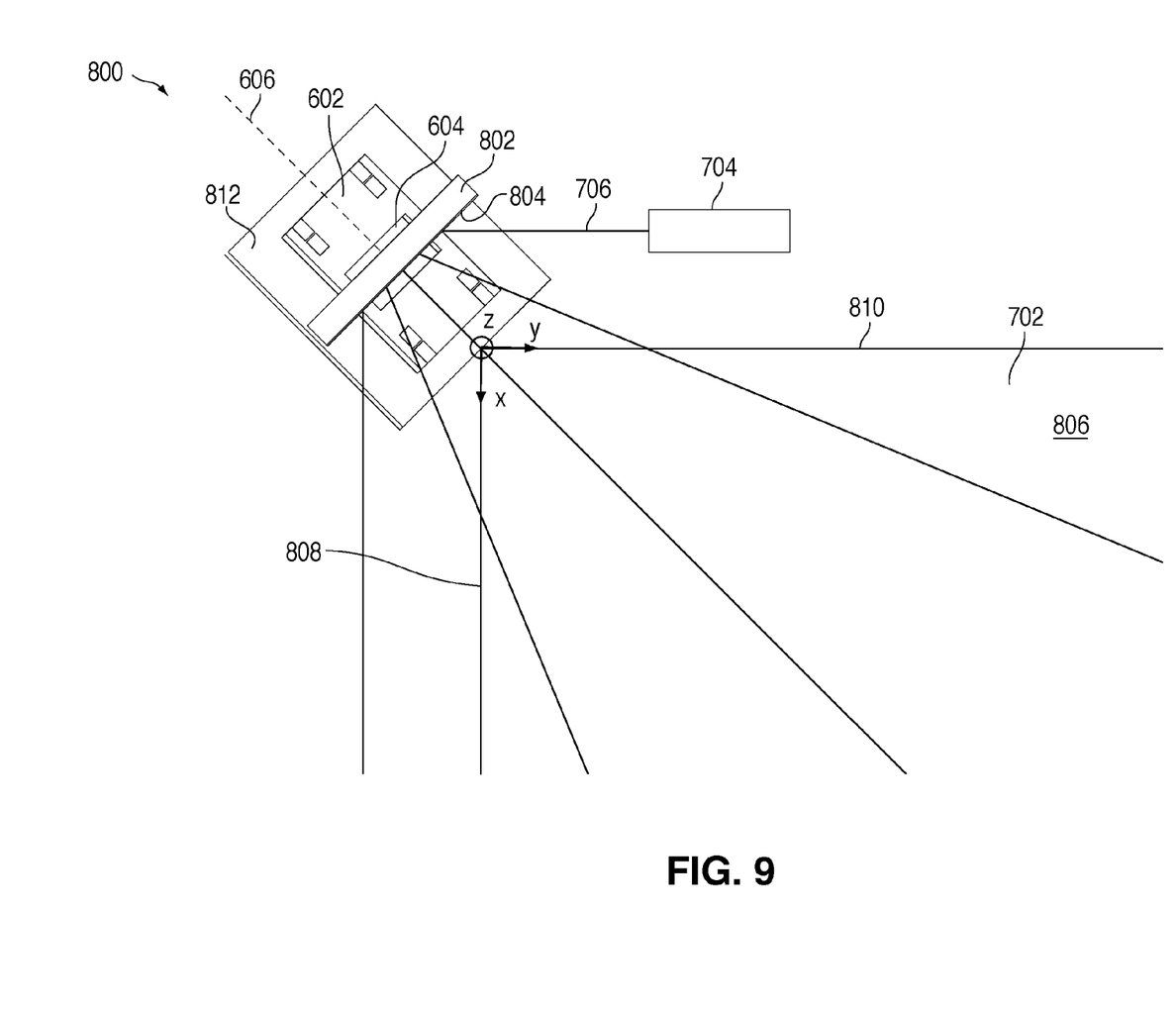
FIG. 9 illustrates a top view of the touch panel system of FIG. 8 in one or more embodiments of the present disclosure.
Figure 10:
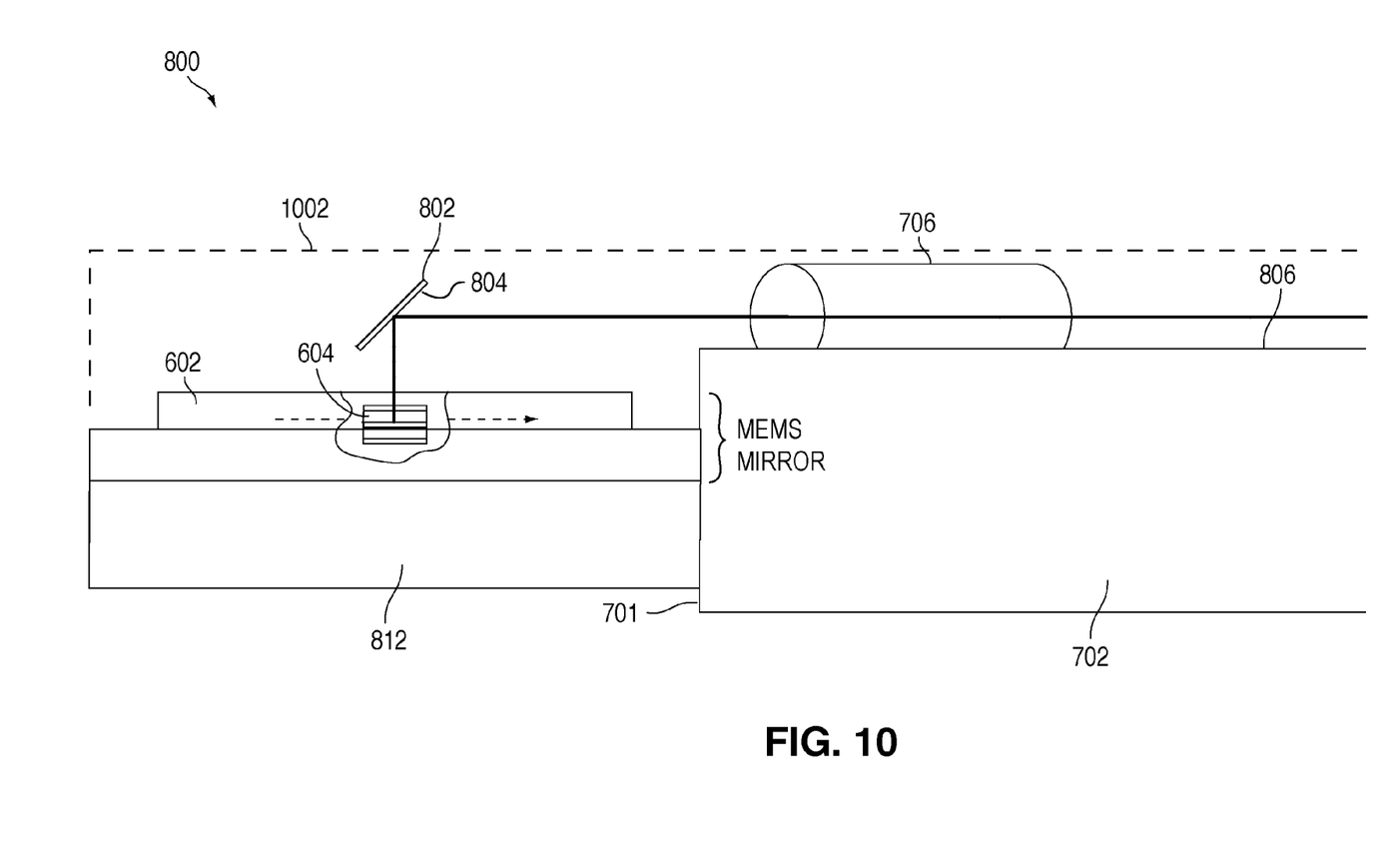
FIG. 10 illustrates a side view of the touch panel system of FIG. 8 in one or more embodiments of the present disclosure.

FIGS. 8, 9, and 10 illustrate perspective, top, and side views of a touch panel system 800 with MEMS package 602 located in a bezel 1002 (FIG. 10) at corner 701 of screen 702 in a substantially horizontal configuration in one or more embodiments of the present disclosure. XYZ coordinates are defined relative to corner 701. Emitter 704 also located in the bezel generates beam 706 toward a fixed mirror 802 located above MEMS package 602. Fixed mirror 802 has a reflective surface 804 that is angled about 45 degrees relative to a top surface 806 of screen 702 (the XY-plane). Reflective surface 804 is also angled about 45 degrees relative lateral sides 808 and 810 of the screen that join at corner 701 (the XZ and the YZ planes). Angled as such, fixed mirror 802 may have an effective height of less than 2 mm when its height is less than 2.83 mm.

MEMS package 602 is fixed to a mount 812. MEMS package 602 is oriented in a substantially horizontal manner where its longer dimensions are generally horizontal, its shorter dimension is generally vertical, and rotational axis 606 of the MEMS package is parallel to top surface 806 of screen 702 (the XY plane). MEMS package 602 is tilted slightly about rotational axis 606 so reflective surface 608 of MEMS scanning mirror 604 at rest is angled about 22.5 degrees relative to top surface 806. MEMS package 602 is also rotated about the Z-axis so rotational axis 606 bisects screen corner 701 (the X and Y-axes). In general, if mirror package 602 rotates –22.5-A degrees along the Z-axis, then the package needs to be rotated along rotational axis 606-A degrees. This orientation allows MEMS scanning mirror 604 to mechanically rotate ±22.5 degrees about a rotational axis 608 that bisects corner 701, which generates an optical scan angles of ±45 degrees that covers a total f 90 degrees over screen 702.

As shown in FIG. 10, the top of MEMS package 602 is located below screen 702. The only elements that protrude above screen 702 are fixed mirror 802 and emitter 704. Emitter 704 has a height of less than 2 mm so it is taller than screen 702 by less than 2 mm. The effective height of fixed mirror 802 is less than 2 mm so it is taller than screen 702 by less than 2 mm. Thus, the horizontal configuration in system 800 allows a bezel 1002 (in phantom) to be less than 2 mm above screen 702.

Although only one MEMS group at one corner is shown, system 800 may include two or more MEMS groups at two or more corners similar to system 300. Like system 300 (FIG. 3), system 800 may include an array of photo sensors aligned along the edge of screen 702 between two adjacent MEMS groups. These photo sensors are coupled in parallel and have their lateral sensor surfaces facing into screen 702 to collect any reflected signal.

Figure 11:
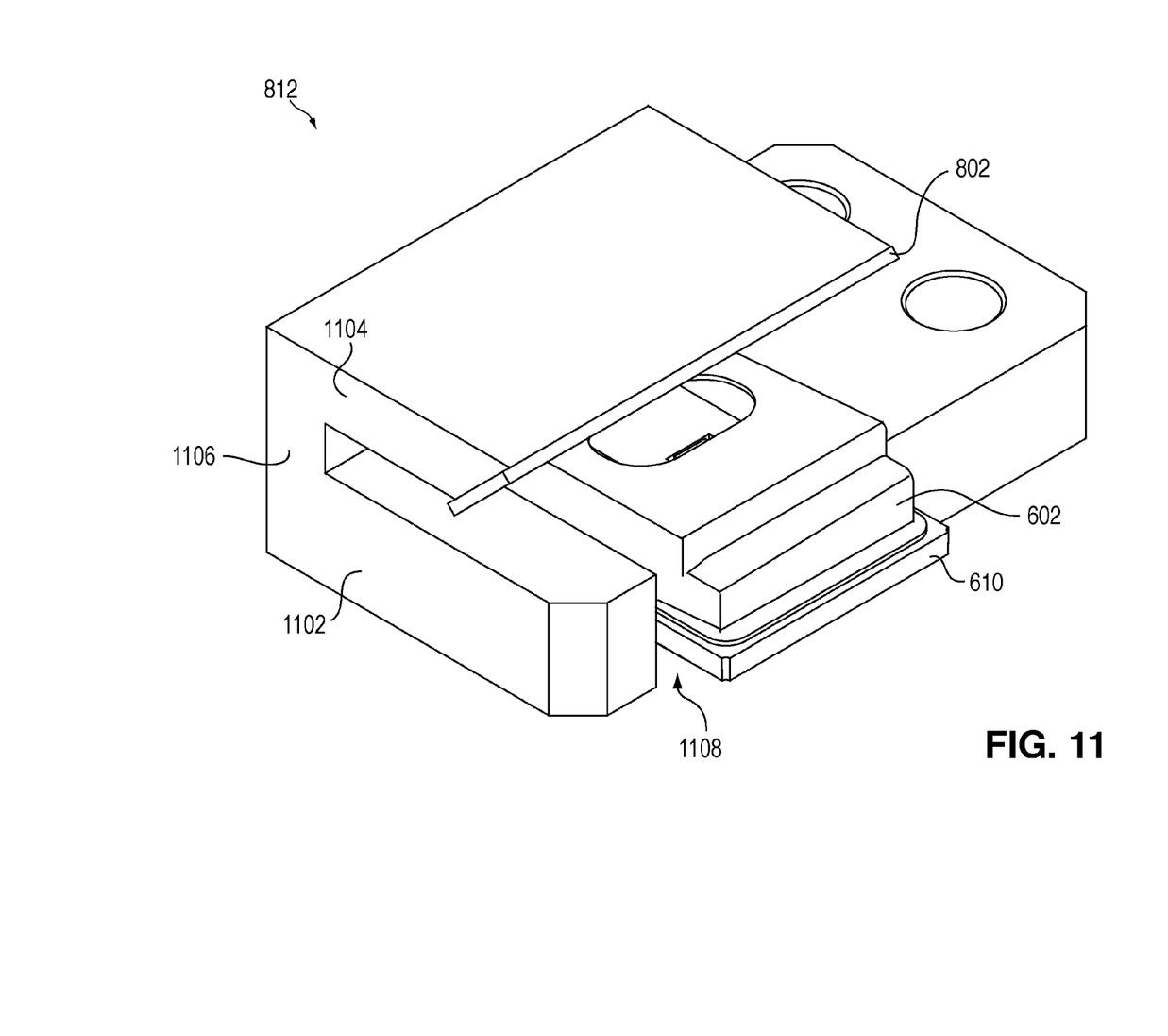
FIG. 11 illustrates a perspective view of a mount for the MEMS package of FIG. 6 in one or more embodiments of the present disclosure.

FIG. 11 illustrates a perspective view of mount 812 for positioning MEMS package 602 in one or more embodiments of the present disclosure. Mount 812 has a generally U-shape with a base 1102 and a top 1104 jointed by a vertical section 1106. Base 1102 includes a cutout 1108 for receiving MEMS package 602. Top 1104 has a 45 degree angled edge against which mirror 802 is fixed above MEMS package 602.

Figure 12:
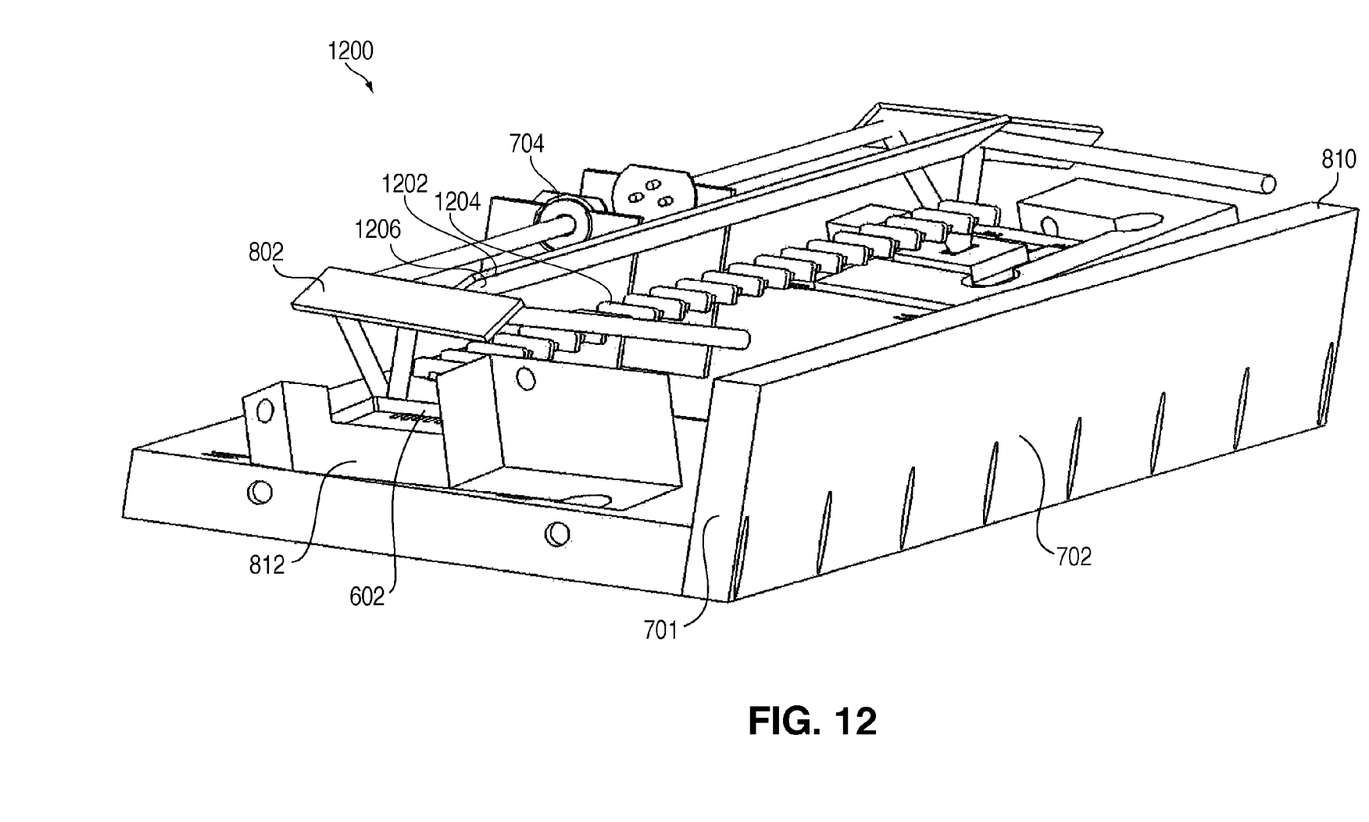
FIG. 12 illustrates a perspective view of a touch panel system with the MEMS package of FIG. 6 located at a corner of a screen in a substantially horizontal configuration in one or more embodiments of the present disclosure

FIG. 12 illustrates a touch panel system 1200 with MEMS package 602 located in the bezel (not shown) at corner 701 of screen 702 in a substantially horizontal configuration in one or more embodiments of the present disclosure. System 1200 is similar to system 800 but includes another fixed mirror 1102 and a linear array of photo sensors 1104 (only one is labeled) arranged along lateral side 810 of screen 702. Fixed mirror 1102 has a reflective surface 1106 that is angled about 45 degrees relative to top surface 806 (FIG. 8) of screen 702 (the XY plane). Photo sensors 1104 have their sensing surfaces facing up toward fixed mirror 1102 to receive reflected light from screen 702. Fixed mirror 1102 and photo sensors 1104 may run between two MEMS groups at two corners.

Figure 13:
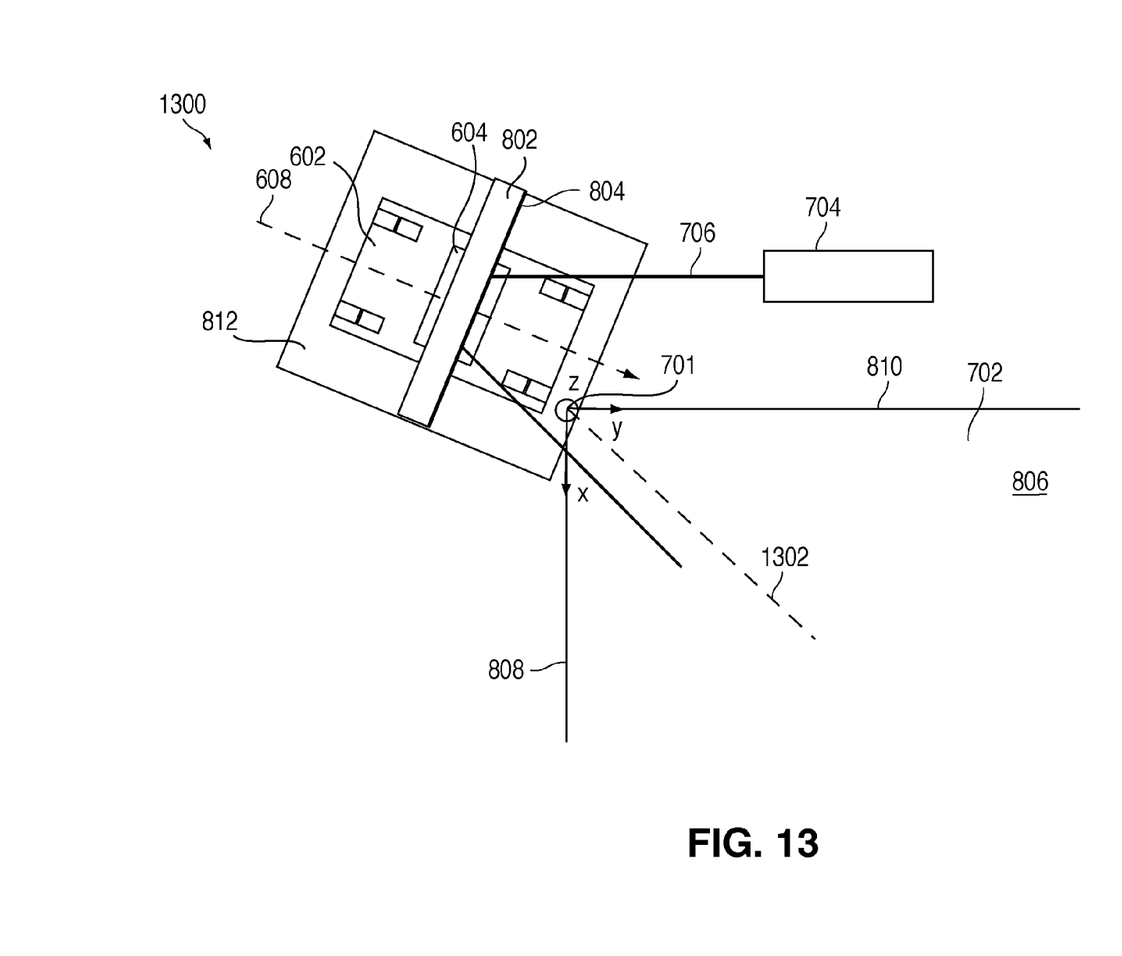
FIG. 13 illustrates a top view of a touch panel system with the MEMS package of FIG. 6 located at a corner of a screen in a horizontal configuration in one or more embodiments of the present disclosure.
Figure 14:
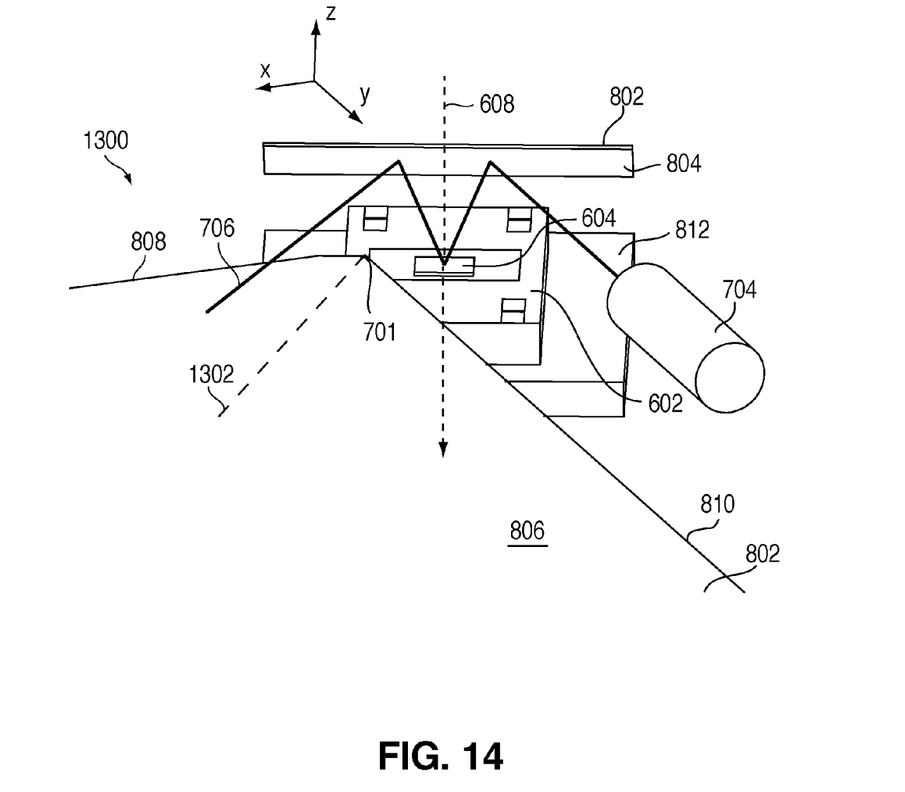
FIG. 14 illustrates a perspective view of the touch panel system of FIG. 13 in one or more embodiments of the present disclosure.

FIGS. 13 and 14 illustrate top and respective views of a touch panel system 1300 with MEMS package 602 located in the bezel (not shown) at corner 701 of screen 702 in a horizontal configuration in one or more embodiments of the present disclosure. Emitter 704 is located in the bezel and generates beam 706 toward a fixed mirror 802 located above MEMS package 602. Reflective surface 804 of fixed mirror 802 is angled about 45 degrees relative to top surface 806 of screen 702 (the XY plane). Reflective surface 804 is also angled about 22.5 and 67.5 degrees relative lateral sides 808 and 810 of screen 702 (the XZ plane and the YZ plane), respectively.

MEMS package 602 is fixed to mount 812. MEMS package 602 is oriented in a substantially horizontal manner where its longer dimensions are generally horizontal, its shorter dimension is generally vertical, and rotational axis 606 of the MEMS package is parallel to top surface 806 of screen 702 (the XY plane). At rest, reflective surface 608 of MEMS scanning mirror 604 is substantially parallel to top surface 806. MEMS package 602 is also rotated about the Z-axis so rotational axis 606 is angled about 67.5 degrees from lateral side 808 (the X-axis) and 22.5 degrees from lateral side 810 (the Y-axis), where the rotational axis is angled at 22.5 degrees from a line 1202 that bisects screen corner 701. In general, if mirror package 602 rotates –22.5-A degrees along the Z-axis, then the package needs to be rotated along rotational axis 606-A degrees. This orientation allows MEMS scanning mirror 604 to mechanically rotate ±22.5 degrees about one axis and generate optical scan angles of ±45 degrees centered about line 1202, which covers a total of 90 degrees over screen 702.

Various other adaptations and combinations of features of the embodiments disclosed are within the scope of the invention. For example, emitter 704 in systems 800 (FIG. 8) and 1200 (FIG. 12) may be replaced by a photo sensor to a variation of system 500 in which omni-directional light created by a coating on a screen is detected by the photo sensor to determine the point of touch. Numerous embodiments are encompassed by the following claims.

The invention claimed is:

1. A touch screen display, comprising:
   a screen;
   a bezel around the screen;
   a micro-electro-mechanical system (MEMS) package located within the bezel, the MEMS package comprising a MEMS scanning mirror, the top of the MEMS package being located below the top of the screen;
   a fixed mirror located in the bezel above the MEMS scanning mirror; and
   a light source directing light to the fixed mirror, wherein the fixed mirror directs the light to the MEMS scanning mirror, the MEMS scanning mirror directs the light back to the fixed mirror, the fixed mirror directs the light over and parallel to the screen, and the light is scanned over a portion of the screen when the MEMS scanning mirror oscillates.

2. The display of claim 1, wherein a reflective surface of the fixed mirror is angled at about 45 degrees relative to a top surface of the screen.

3. The display of claim 1, wherein the fixed mirror is taller than the screen by less than 2 mm.

4. The display of claim 1, wherein the MEMS scanning mirror has a rest position about a rotational axis parallel to a top surface of the screen, the MEMS package is oriented so a reflective surface of the MEMS scanning mirror at the rest position is tilted relative to the top surface of the screen.

5. The display of claim 4, wherein the MEMS scanning mirror has a mechanical scan angle of about ±22.5 degrees about the rest position, and the reflective surface of the MEMS scanning mirror at the rest position is tilted at about 22.5 degrees relative to the top surface of the screen.

6. The display of claim 5, wherein the MEMS package is located at a corner of the screen and the rotational axis of the MEMS scanning mirror bisects the corner of the screen.

7. The display of claim 6, wherein the fixed mirror is angled at about 45 degrees relative to two lateral sides of the screen that form the corner.

8. The display of claim 1, wherein the MEMS scanning mirror has a rest position about a rotational axis, the MEMS package is oriented so a reflective surface of the MEMS scanning mirror at the rest position is parallel to a top surface of the screen.

9. The display of claim 8, wherein the MEMS scanning mirror has a mechanical scan angle of about ±22.5 degrees about the rest position.

10. The display of claim 9, wherein the MEMS package is located at a corner of the screen and the MEMS package is oriented so the rotational axis of the MEMS scanning mirror is angled at about 22.5 degrees from a line that bisects the corner of the screen.

11. The display of claim 10, wherein the fixed mirror is angled at about 22.5 degrees and 67.5 degrees relative to two lateral sides of the screen that form the corner.

12. The display of claim 1, wherein the light source is taller than the screen by less than 2 mm.

13. The display of claim 1, further comprising one or more photo sensors comprising one or more lateral light sensing surfaces facing the screen, the one or more photo sensors receiving the light reflected from an object about the screen.

14. The display of claim 13, wherein the one or more photo sensors are aligned along an edge of the screen between the MEMS package and another MEMS package at an adjacent corner.

15. The display of claim 14, wherein the one or more photo sensors are coupled in parallel.

16. The display of claim 1, further comprising:
one or more photo sensors comprising one or more top light sensing surfaces; and
an other fixed mirror above the one or more photo sensors, the other fixed mirror directing the light reflected from an object about the screen to the one or more top light sensing surfaces, the other fixed mirror being about 45 degrees relative to the top surface of the screen.

17. The display of claim 16, wherein the one or more photo sensors are aligned along an edge of the screen between the MEMS package and another MEMS package at an adjacent corner.

18. The display of claim 17, wherein the one or more photo sensors are coupled in parallel.

19. The display of claim 1, wherein the bezel is taller than the screen by less than 2 mm.

20. The display of claim 1, wherein the screen is part of a flat panel display or a projection screen for a projection display system.

21. A method for providing a touch screen display, comprising:

providing a screen;
locating a MEMS package in a bezel area around a perimeter of the screen, the MEMS package comprising a MEMS scanning mirror, a top of the MEMS package being located below a top of the screen;
locating a bezel around the screen over the MEMS package;
locating a fixed mirror above the MEMS scanning mirror in the bezel area; and locating a light source in the bezel area, the light source directing light to the fixed mirror, wherein the fixed mirror directs the light to the MEMS scanning mirror, the MEMS scanning mirror directs the light back to the fixed mirror, the fixed mirror directs the light over and parallel to the top surface of the screen, and the light is scanned over a portion of the screen when the MEMS scanning mirror oscillates.

22. The method of claim 21, wherein the MEMS scanning mirror has a rest position about a rotational axis parallel to a top surface of the screen, the method further comprising orienting the MEMS package so a reflective surface of the MEMS scanning mirror at the rest position is tilted relative to the top surface of the screen.

23. The method of claim 22, wherein the MEMS scanning mirror has a mechanical scan angle of about ±22.5 degrees about the rest position, and the reflective surface of the MEMS scanning mirror at the rest position is tilted at about 22.5 degrees relative to the top surface of the screen.

24. The method of claim 23, wherein the MEMS package is located at a corner of the screen and the rotational axis of the MEMS scanning mirror bisects the corner of the screen.

25. The method of claim 24, further comprising orientating the fixed mirror at about 45 degrees relative to two lateral sides of the screen that form the corner.

26. The method of claim 21, wherein the MEMS scanning mirror has a rest position about a rotational axis, the method further comprising orienting the MEMS package so a reflective surface of the MEMS scanning mirror at the rest position is parallel to a top surface of the screen.

27. The method of claim 26, wherein the MEMS scanning mirror has a mechanical scan angle of about ±22.5 degrees about the rest position.

28. The method of claim 27, wherein the MEMS package is located at a corner of the screen and the MEMS package is oriented so the rotational axis of the MEMS scanning mirror is angled at about 22.5 degrees from a line that bisects the corner of the screen.

29. The method of claim 28, further comprising orienting the fixed mirror at about 22.5 degrees and 67.5 degrees relative to two lateral sides of the screen that form the corner.

30. The method of claim 28, further comprising locating one or more photo sensors in the bezel area, the one or more photo sensors comprising one or more lateral light sensing surfaces facing the screen, the one or more photo sensors receiving the light reflected from an object about the screen.

31. The method of claim 30, wherein the one or more photo sensors are aligned along an edge of the screen between the MEMS package and another MEMS package at an adjacent corner.

32. The method of claim 31, further comprising coupling outputs of the one or more photo sensors in parallel.

33. The method of claim 28, further comprising:
locating one or more photo sensors in the bezel area, the one or more photo sensors comprising one or more top light sensing surfaces; and
locating an other fixed mirror above the one or more photo sensors in the bezel area, the other fixed mirror directing the light reflected from an object about the screen to the one or more top light sensing surfaces, the other fixed mirror being about 45 degrees relative to the top surface of the screen.

34. The method of claim 33, wherein the photo sensors are aligned along an edge of the screen between the MEMS package and another MEMS package at an adjacent corner.

35. The method of claim 34, further comprising coupling outputs of the one or more photo sensors in parallel.

36. The method of claim 21, wherein a reflective surface of the fixed mirror is angled at about 45 degrees relative to a top surface of the screen.

37. The method of claim 21, wherein the fixed mirror is taller than the screen by less than 2 mm.

38. The method of claim 21, wherein the light source is taller than the screen by less than 2 mm.

39. The method of claim 21, wherein the bezel is taller than the screen by less than 2 mm.

40. The method of claim 21, wherein the screen is part of a flat panel display or a projection screen for a projection display system.

* * * * *